Dec. 5, 1967     H. STREHLE ETAL     3,356,985
PHOTOGRAPHIC CAMERA
Filed Sept. 30, 1965
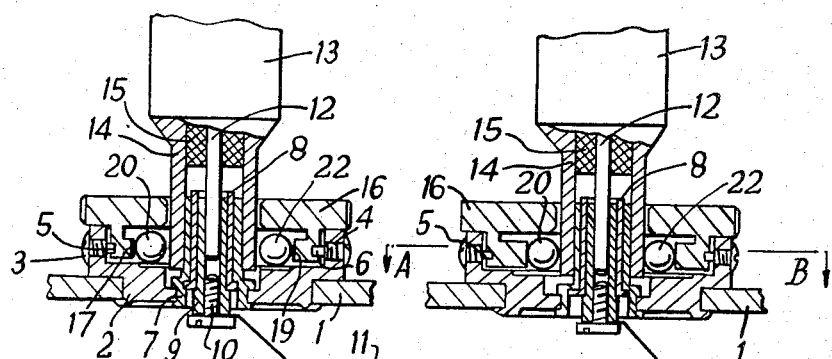
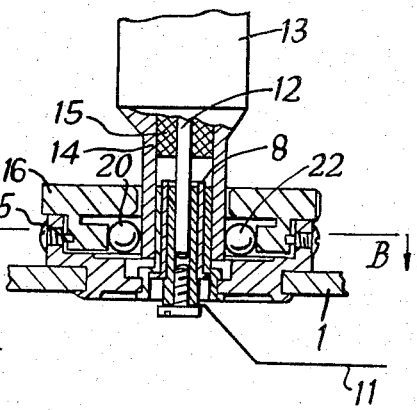
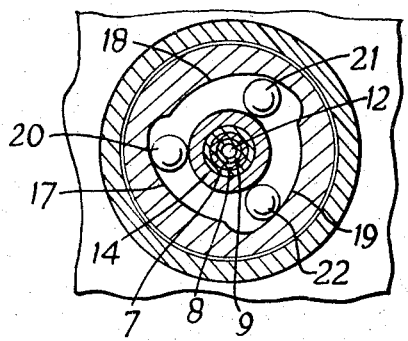
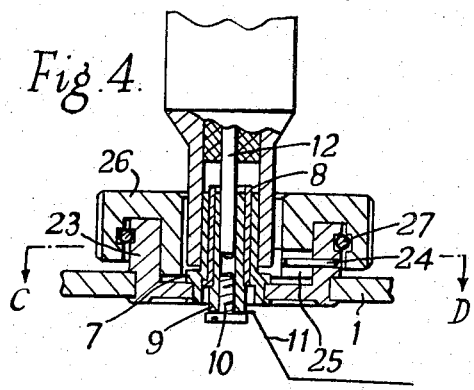
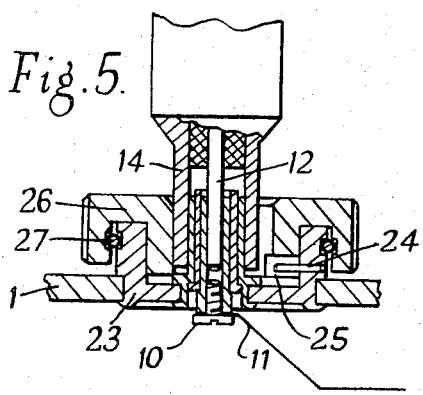
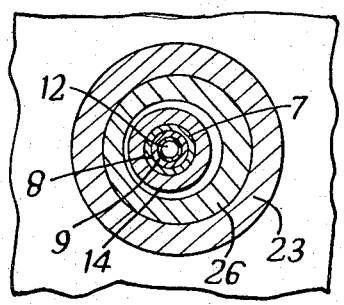
INVENTORS
HORST STREHLE
GUNTER SCHMATZE
BY
Young & Thompson
ATTORNEYS

United States Patent Office 3,356,985
Patented Dec. 5, 1967

3,356,985
PHOTOGRAPHIC CAMERA
Horst Strehle and Gunter Schmatze, Dresden, Germany, assignors to Veb Pentacon Dresden Kamera- und Kinowerke, Dresden, Germany
Filed Sept. 30, 1965, Ser. No. 491,750
3 Claims. (Cl. 339—91)

ABSTRACT OF THE DISCLOSURE

A photographic camera has a flash socket located on the housing and can receive the plug of a flash lamp. On insertion of the plug a clamping ring on the socket is rotated so that balls located between the clamping ring and the plug are forced against the plug by surfaces which have axes of curvature offset from the central axis of the plug. In this manner the plug is locked against inadvertent removal.

---

The invention relates to a plug coupling for the electric connection of a flash apparatus with a photographic camera, in which a plug sleeve is connected in force-effected fashion with a contact socket on the camera.

Objects of the invention are to provide a cheap, non-self-detachable plug coupling between flash apparatus and photographic camera.

A further object of the invention is to provide a lockable plug coupling between flash apparatus and photographic camera by means which are arranged on the camera in the region of the flash contact socket. Such couplings enable ordinary commercial standard plugs to be used and locked.

The invention is to be explained in greater detail hereinafter with reference to two examples of embodiment. In the accompanying drawings:

FIGURE 1 shows a plug coupling in section having a rolling body clamp ratchet arrangement;

FIGURE 2 shows the plug coupling according to FIGURE 1 with plug sleeve clamped;

FIGURE 3 shows the section A–B according to FIGURE 2;

FIGURE 4 shows a plug coupling in section with clamping by an eccentric clamping ring;

FIGURE 5 shows the plug coupling according to FIGURE 4 with clamped plug sleeve;

FIGURE 6 shows the section C–D according to FIGURE 5.

The form of embodiment according to FIGURES 1–3 consists of the following parts:

A mounting ring 2 is fixedly inserted into a housing part 1 of a photographic camera. This mounting ring 2 possesses two screws 3 and 4, each of which possesses a pin-like extension 5 and 6. A fixedly arranged tubular contact socket fitting 7 is situated in the internal diameter of the mounting ring 2. An insulating sleeve 8 and a tubular contact socket 9 are pushed into the socket fitting 7 and firmly connected therewith. One current lead 11 is connected with the contact socket 9 by a screw 10. A pin 12 of a plug 13 engages in the contact socket 9. A sleeve 14 of the plug 13 here surrounds the external diameter of the socket fitting 7. Between the plug sleeve 14 and the plug pin 12 there is an insulating piece 15. The pin-like extensions 5 and 6 of the screws 3 and 4 engage in corresponding grooves of a clamping ring 16. The latter preferably possesses three clamping surfaces 17, 18 and 19, three rolling bodies 20, 21 and 22 being mounted between these and the plug sleeve.

The manner of operation of the coupling connection according to FIGURES 1–3 is as follows:

By pushing of the plug pin 12 into the contact socket 9, the plug sleeve 14 at the same time is pushed over the socket fitting 7. Thus the electric connection is constituted between the current lead 11 on the camera and the current lead of the flash apparatus, which is connected with the plug pin 12 and is not illustrated further.

So that this plug coupling cannot disengage itself or be disengaged by touching by mistake, after the fitting together the clamping ring 16 is rotated in the clockwise direction. Due to the wedge-shaped arrangement of the clamping surfaces 17, 18 and 19 a clamping of the rolling bodies 20, 21 and 22 occurs between the clamping surfaces 17, 18 and 19 and the plug sleeve 14. Thus a secure, non-self-detachable force-locking of the plug pin in the contact socket 9 is ensured, it being however a prerequisite that there is a small air gap between the mounting ring 23 and the clamping ring 26. In order to disengage the force-locking and thus the plug coupling the mounting ring 16 is rotated in the counter-clockwise direction. Thus the space between plug sleeve 14 and the clamping surfaces 17, 18 and 19 is increased again, so that the rolling bodies 20, 21 and 22 are freed from their clamped position 1.

The form of embodiment according to FIGURES 4–6 consists of the following parts:

Into the housing part 1 of the photographic camera there is again fixedly inserted a mounting ring 23. In the internal diameter of the mounting ring 23 there are similarly again the socket fitting 7 firmly connected with the mounting ring 23, the insulating sleeve 8 and the contact socket 9. Here again the current lead 11 is electrically connected with the contact socket 9 by the screw 10. The plug pin 12 again engages in the contact socket. The mounting ring 23 possesses a pin 24 which extends into a cut-away portion 25 of a clamping ring 26. So that the clamping ring 26 cannot be disengaged from the mounting ring 23, a spring ring 27 is also provided.

The manner of operation of the coupling connection according to FIGURES 4–6 is similar to that according to FIGURES 1–3. Here again the electric connection between flash apparatus and photographic camera is constituted through the plug pin 12 and the contact socket 9. For the clamping of the plug sleeve 14 with the socket fitting 7 the clamping ring 26 is rotated in the clockwise direction. The force-locking here is effected by the eccentric arrangement of the internal diameter of the clamping ring 26, in that a surface of the internal diameter places itself in frictional engagement against the plug sleeve 14.

Disengagement is again effected by rotation of the clamping ring 26 in the counterclockwise direction.

We claim:

1. In a photographic camera having a housing and an electric flash firing circuit arranged therein, the provision of a socket for receiving a plug formed with a cylindrical outer contact and a pin contact coaxial with said cylindrical contact, said socket comprising:
   (a) an annular support member fitting at one end thereof in an aperture in said housing, said support member having a cylindrical wall,
   (b) a first tubular contact element extending coaxially with said support member within the cylindrical wall,
   (c) an insulating sleeve coaxially arranged within said first tubular contact element,
   (d) a second tubular contact element rigidly mounted within said sleeve and coaxial therewith,
   (e) a rotatable annular clamping ring having an annular portion forming together with said first contact element an annular opening for receiving the cylindrical contact of the plug and having a sleeve portion located within the cylindrical wall of the support member, the inner surface of said sleeve having at least one curved surface the axis of curvature which is eccentric of the axis of the support member, and (f) a roller body located between each curved surface and the first tubular contact element and having a diameter larger than the radial dimension of said annular opening to ensure retention of the rolling body, whereby on rotation of the clamping ring the curved surface causes a radial force to be exerted against the surface of the cylindrical contact of the plug by way of the rolling body.

2. A photographic camera according to claim 1, wherein the clamping member is provided with three equiangularly spaced curved surfaces and three rolling bodies contacting said curved surfaces.

3. In a photographic camera having a housing and an electric flash firing circuit arranged therein, the provision of a socket for receiving a plug formed with a cylindrical outer contact and a pin contact coaxial with said cylindrical contact, said socket comprising:

(a) an annular support member fitting at one end thereof in an aperture in said housing, said support member having a cylindrical wall, (b) a first tubular contact element extending coaxially with said support member within the cylindrical wall, (c) an insulating sleeve coaxially arranged within said first tubular contact element, (d) a second tubular contact element rigidly mounted within said sleeve and coaxial therewith, and (e) a rotatable clamping ring having an annular portion forming together with said first contact element an annular opening for receiving the cylindrical contact of the plug and having a sleeve portion located within the cylindrical wall of the support member, the inner surface of said sleeve being cylindrical and eccentric to the axis of the first contact element, whereby on rotation of the clamping ring the inner cylindrical surface of the latter engages the cylindrical contact to lock the plug against accidental removal.

References Cited

UNITED STATES PATENTS 2,074,393  2/1937  Hixon _____ 339—274

FOREIGN PATENTS 686,116  12/1939  Germany.
749,918  5/1944  Germany.
676,061  7/1952  Great Britain.
769,670  3/1957  Great Britain.

MARVIN A. CHAMPION, *Primary Examiner.*

J. H. McGLYNN, *Assistant Examiner.*